United States Patent [19]

Laudereau

[11] Patent Number: 5,372,521
[45] Date of Patent: Dec. 13, 1994

[54] ELECTRICAL CONNECTION BAR FOR TERMINALS

[75] Inventor: G. Laudereau, Valbonne, France

[73] Assignee: Telemecanique, Rueil Malmaison, France

[21] Appl. No.: 86,208

[22] Filed: Jul. 6, 1993

[30] Foreign Application Priority Data

Jul. 3, 1992 [FR] France .................. 92 08343

[51] Int. Cl.$^5$ .......................................... H01R 31/08
[52] U.S. Cl. ................................ 439/507; 439/723
[58] Field of Search ............... 430/507, 509, 510–515, 430/885, 402, 403, 721, 723, 736, 936, 937

[56] References Cited

U.S. PATENT DOCUMENTS

| | | | |
|---|---|---|---|
| 2,786,162 | 3/1957 | Ballou | 439/507 |
| 2,872,658 | 3/1959 | Batcheller | 439/723 |
| 3,601,754 | 8/1971 | Filson | 439/507 |
| 3,998,517 | 12/1976 | Griffin | 439/723 |
| 4,466,692 | 8/1984 | Sonoda | 439/937 |
| 4,689,718 | 8/1987 | Naue et al. | |
| 5,000,699 | 3/1991 | Nadin | 439/507 |

FOREIGN PATENT DOCUMENTS 2190319 1/1974 France .
2600795 7/1977 Germany .

*Primary Examiner*—Larry I. Schwartz
*Assistant Examiner*—Hien D. Vu
*Attorney, Agent, or Firm*—Oblon, Spivak, McClelland, Maier & Neustadt

[57] ABSTRACT

An electrical connection bar for terminals consists of a cut conductive strip having the shape of a comb whose teeth constitute lugs that serve as the bridging for the terminals. The strip is coated in a jacket of insulating plastic leaving the ends of the connection lugs bare. The metal conductive strip forms a plurality of segments that are joined, laterally, with lugs which constitute bridgings between the segments.

6 Claims, 1 Drawing Sheet

ELECTRICAL CONNECTION BAR FOR TERMINALS

BACKGROUND OF THE INVENTION

1. Field of the Invention

This invention relates to an electrical connection bar for terminals, consisting of a cut conductive strip having the shape of a comb whose teeth constitute lugs that serve as a bridge for the terminals, this conductive strip being coated in a jacket of insulating plastic leaving the ends of the connection lugs bare.

2. Description of the Related Art

Bars called omnibus bars are used that serve as the connection or as the electrical bridging for terminals of electrical devices. A connection bar of this type has the shape of a metal comb whose teeth constitute the lugs for connection to the terminals of the device or devices, Patent FR 2,190,319 describes, for example, a bar of the preceding type on which an insulating coating is provided.

SUMMARY OF THE INVENTION

The present invention has as an object to provide a comb-shaped connection bar which can easily be sectioned. The sectioning operation can be performed without tools and without touching the metal part, and therefore very reliably. After sectioning, the sectioned parts remain insulated on their sectioned ends.

According to the invention, the bar includes a metal conductive strip formed of a plurality of elongate conductive segments that are joined, laterally, with lugs which constitute bridgings between said segments.

According to a further characteristic, adjacent segments are separated by slots or indentations extending perpendicular to the longitudinal direction of the segments of bar.

According to yet another characteristic, the sediments have a W or U shape.

BRIEF DESCRIPTION OF THE DRAWINGS

The invention will now be described with more detail with reference to an embodiment given by way of example and illustrated by the accompanying drawings in which.

DETAILED DESCRIPTION OF THE PREFERRED EMBODIMENT

Figures 1, 2:
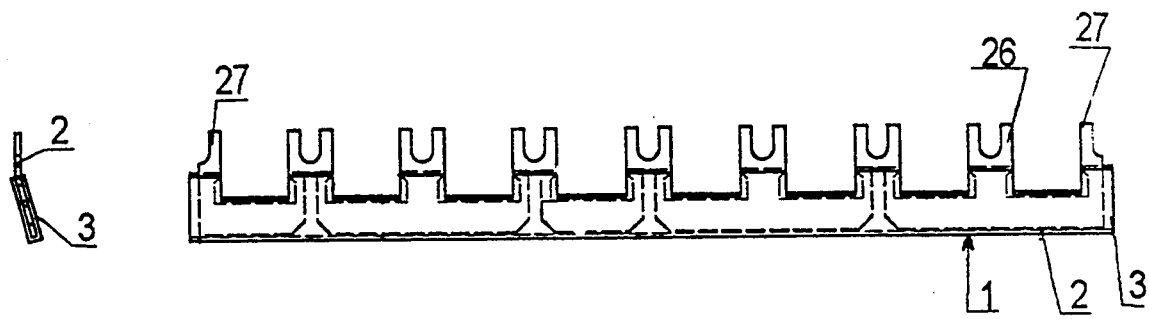
FIG. 1 is a view in elevation of the connection bar according to the invention.
FIG. 2 is a left view of FIG. 1.
Figure 3:
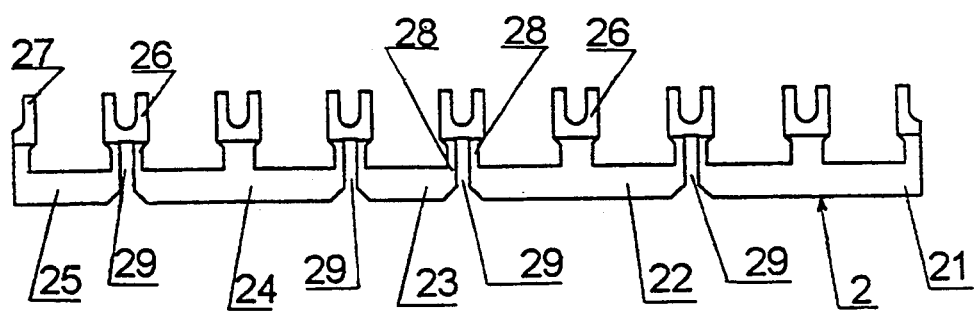
FIG. 3 shows only the cut metal strip of the connection bar.
Figure 4:
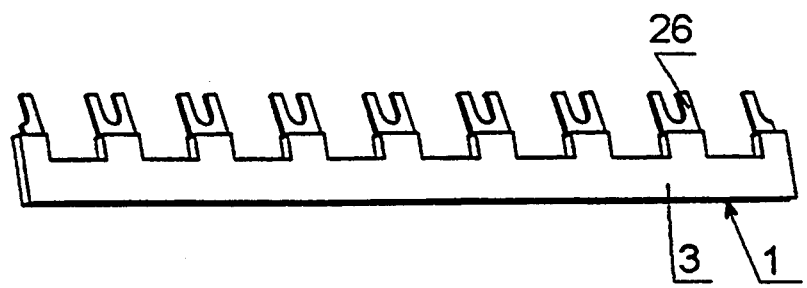
FIG. 4 is a view in perspective of the entire connection bar.

With reference to the drawings, the connection bar marked 1 comprises a cut strip or body 2 made from an electrically conductive metal and that exhibits a general comb shape whose teeth constitute lugs 26 for connection to the terminals of a device or devices, not shown.

In the embodiment shown, lugs 26 are open. These lugs are engaged in the terminals of the device or devices and are tightened under the screws of the terminals. As a variant, the lugs could be closed.

Metal conductive strip or body 2 can be easily obtained by stamping of a metal plate.

This conductive metal strip or body 2 is formed of a plurality of elongate segments 21, 22, 23, 24, 25, adjacent ones of which are joined at their ends via the lugs 26 which constitute bridgings between these segments. The adjacent segments are separated by slots or indentations 29 extending perpendicular to the longitudinal direction of the segments of the bar. Each segment is formed by a longitudinal strip that is connected at its ends to lugs 26 by tabs 28. End lugs 27 are half-lugs that are engaged only on one side of the connecting screws. Each slot or indentation 29 is centered on the axis of symmetry of the bridging lug 26 of two adjacent segments.

Certain segments referenced 21, 22, 24 have a W shape. Other segments referenced 23, 25 have a U shape.

Preferably, lugs 26 are located in a plane forming a dihedron with the plane of the connected segments (FIG. 2), the fold being located at the base of the lugs. This arrangement facilitates the mounting of the bars.

Conductive metal strip 2 is coated by a coating 3 of insulating plastic material which covers segments 21 to 25 while leaving lugs 26 bare. This coating 3 fills indentations 29.

The bar described above can in particular be used as a shunt bar for terminal blocks of programmable controllers.

The pitch between lugs 26 can vary from one segment to another.

Of course, it is possible, without going outside the scope of the invention, to conceive of variants and improvements of detail and even to envisage the use of equivalent means.

What is claimed as new and desired to be secured by Letters Patent of the United States is:

1. An electrical connection bar comprising:
   a plurality of elongate conductive segments;
   a plurality of conductive lugs formed separately from said elongate conductive segments and shaped to connect with electrical terminals and conductively extending from said segments, wherein at least some of said lugs are connected to longitudinal ends of adjacent ones of said segments such that said adjacent segments are bridged and joined by said at least some of said lugs and such that said lugs and segments together form a comb shaped body with said lugs forming teeth of the comb shape, and wherein said longitudinal ends of said adjacent segments are spaced apart from each other to form slots therebetween, said slots extending below the lugs bridging and joining said adjacent segments; and
   an insulating coating covering at least said segments.

2. The electrical connection bar of claim 1, wherein said adjacent segments form one of a U shape and a W shape.

3. The electrical connection bar of claim 1, wherein said slots are centered on said lugs bridging said adjacent segments.

4. The electrical connection bar of claim 1, wherein said coating fills said slots.

5. The electrical connection bar of claim 4, wherein said lugs are not covered by said coating.

6. The electrical connection bar of claim 1, wherein said segments are metal and said coating is plastic.

* * * * *